May 19, 1953
H. W. L. KEARNS
2,639,412
CONTROL OF ELECTRICALLY EFFECTED ADJUSTMENTS
OF HORIZONTAL BORING MACHINES
Filed Nov. 2, 1950
5 Sheets-Sheet 1
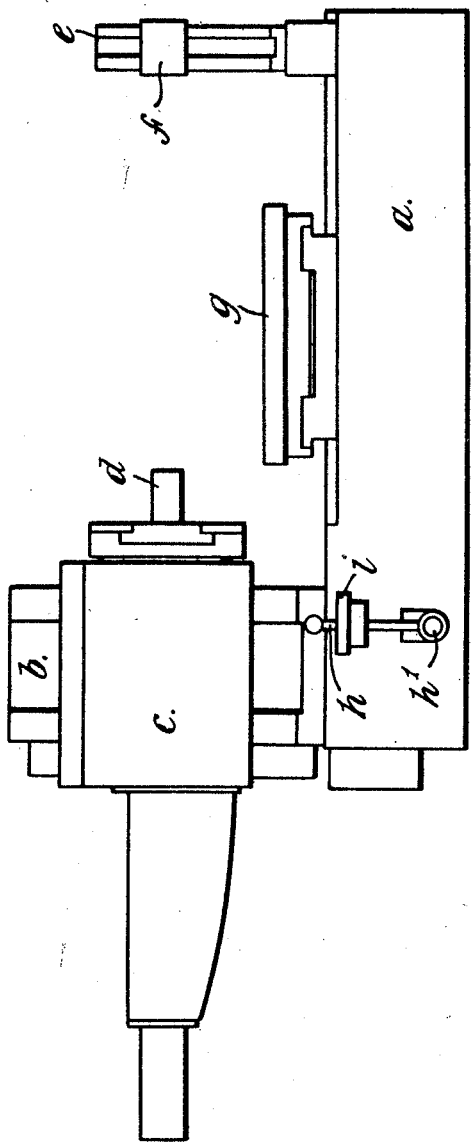
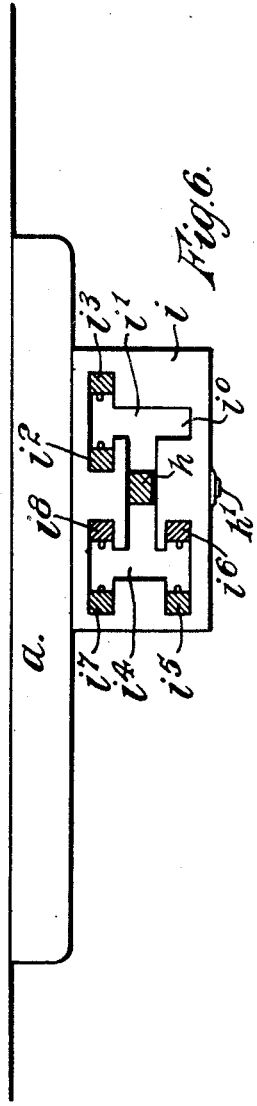
INVENTOR
SIR HENRY WARD LIONEL KEARNS
By: Francis C. Boyer
ATTORNEY May 19, 1953  H. W. L. KEARNS  2,639,412
CONTROL OF ELECTRICALLY EFFECTED ADJUSTMENTS
OF HORIZONTAL BORING MACHINES
Filed Nov. 2, 1950  5 Sheets-Sheet 2

INVENTOR
SIR HENRY W. L. KEARNS
By: Francis E. Boyce
ATTORNEY

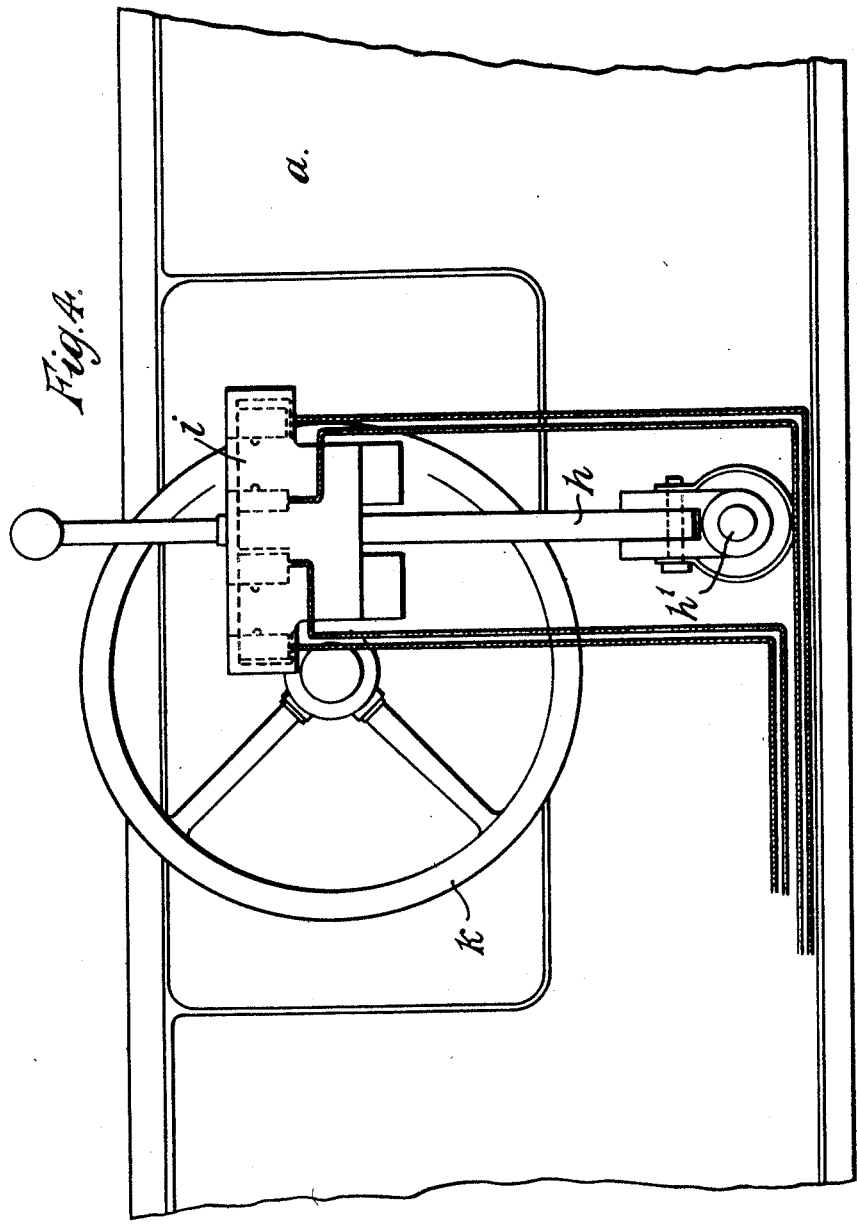

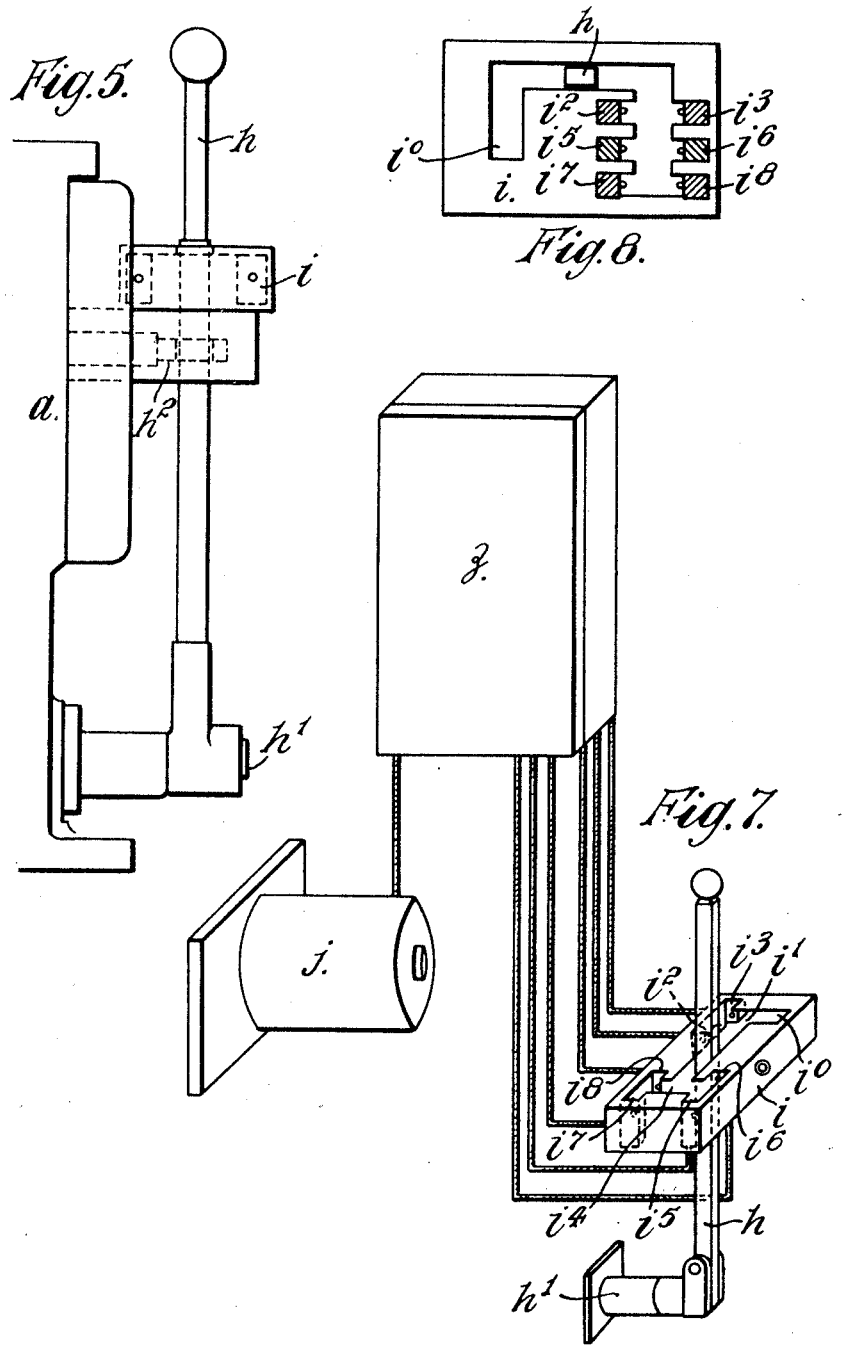

INVENTOR:
HENRY W. L. KEARNS

Patented May 19, 1953

2,639,412

UNITED STATES PATENT OFFICE 2,639,412

CONTROL OF ELECTRICALLY EFFECTED ADJUSTMENTS OF HORIZONTAL BORING MACHINES

Henry Ward Lionel Kearns, Altrincham, England, assignor to H. W. Kearns & Co. Limited, Broadheath, England Application November 2, 1950, Serial No. 193,600
In Great Britain November 24, 1949

2 Claims. (Cl. 318—198)

This invention relates to the control of electrically effected adjustments of horizontal boring machines.

A control system and a control gear for an electromotor to be used for effecting the adjustment of machine tools, has already been proposed in which the electromotor is an alternating current motor which runs normally for effecting coarse adjustments, and for effecting fine adjustments can be connected to a source of direct current by and to run in phase with a slowly rotating switch which for final adjustment may be manually progressively angularly adjusted.

The object of the present invention is to provide a convenient arrangement for actuating such a control system and control gear when applied to a horizontal boring machine to effect adjustments thereof. The adjustments which are effected are the vertical adjustments of the boring spindle slide or head and of the boring stay bearing along their respective columns, and the longitudinal and transverse displacements of the worktable on the bed of the horizontal boring machine, or one or more of such adjustments.

Now in existing horizontal boring machines, an upright control lever, working in a cruciformly slotted gate, is provided for controlling adjustments of the boring spindle slide and of the boring stay bearing, and of the traverses of the worktable, and also initiates the feeds of these various elements of the machine.

The control lever is in the neutral condition when it occupies the central position at the intersection of the two limbs of the cruciform gate slot.

The control lever is thrust angularly into one or the other of the mutually opposite notches of the cruciform gate slot which are parallel to the longitudinal axis of the boring machine, to cause ascent or descent of the spindle slide and of the boring stay bearing, or the longitudinal and transverse displacements in either direction of the worktable, in accordance with which adjusting mechanism is selectively connected to the power drive. The other, transverse, mutually opposed notches of the cruciform gate slot are occupied respectively by the control lever to connect the feed to the respective machine element and by the control lever to become locked in the neutral condition. In being thrust into the transverse notches, the lever displaces a pull rod longitudinally, and it turns a shaft, on which it is pivoted, on being moved into the longitudinal notches.

It may here be explained that the various adjustments and the feeds are preselected whilst the control lever is in neutral.

Final adjustments are effected by slowly turning a handwheel. This requires considerable exertion by the operator with consequent fatigue. It will therefore be readily appreciated that the adoption in a horizontal boring machine of power-effected slow "crawling" and final "inching" adjustments by an electromotor as described above, will be advantageous. As the final adjustments are of the order of thousandths of an inch, the expression "inching," although commonly employed to denote small step-by-step movements, is somewhat inappropriate to denote the final adjustments of a machine tool. Instead therefor hereinafter the expression "impulse" will be used to denote the final step-by-step adjustments.

In the present invention, in a horizontal boring machine having a control lever displaceable in mutually perpendicular directions, such lever, according to the invention, is arranged to control an electromotor to run normally to effect coarse adjustments of the machine and to control a slowly rotatable switch with which such electromotor runs in phase to rotate continuously or to rotate step-by-step in unison with displacements of the lever.

Preferably and conveniently, the control lever, as in existing horizontal boring machines, is an upright lever pivoted at its lower end to a rotatable shaft, and displaceable in a slotted gate, angular displacements of the lever, from a central neutral position, in the longitudinal direction of the machine controlling the directions of and initiating adjustments and a transverse displacement of the lever in one direction connecting feeds, but, instead of transverse displacement in an opposite direction locking the lever in the neutral condition, other transverse displacements thereof are arranged to position the lever to initiate the "crawling" or the "impulse" adjustments.

The gate, for instance, has an H-shaped slot, with notches on both sides of three of the ends of each limb. The neutral position of the control lever is located at the midlength of the crossbar of the H. The three oppositely notched ends of the two limbs of the H slot serve respectively to locate the lever to initiate rapid, crawling and impulse traverses in the respective directions in accordance with the direction in which the lever is thrust into a notch thereof. The lever when pushed into the unnotched end of the one limb of the H slot, starts whichever feed of the machine has been pre-selected. Alternatively, the gate may have an angular U-shaped slot, one limb of which receives the lever to start the feed and the other limb of which has three pairs of opposed notches, respectively for rapid, crawling and impulse traverses.

A horizontal boring machine provided with an adjustment controlling gear according to the invention is shown, by way of example, more or less diagrammatically in the accompanying drawings, in which:

Fig. 1 is a side elevation of a horizontal boring machine,

On a larger scale:

Fig. 4 is a side elevation of a portion of the machine showing the control lever, Fig. 5 is a corresponding end elevation, and Fig. 6 is a corresponding plan.

Fig. 7 is a perspective diagram showing the connections between the control lever and other units of the adjusting contrivances.

Fig. 8 shows in plan an alternative gate.

Figure 9:
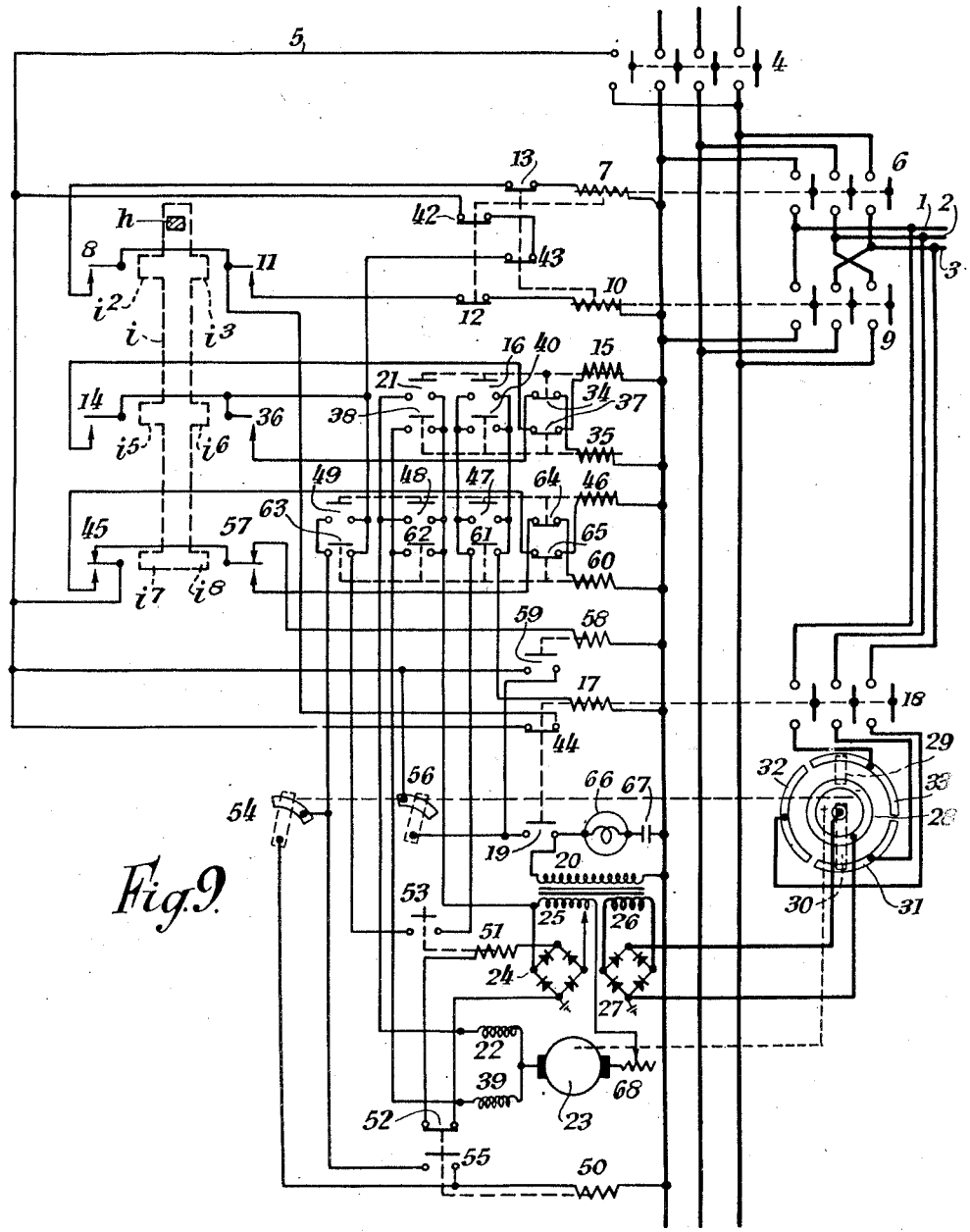

Fig. 9 is a theoretical diagram of the electric circuits simplified by the omission of fuses, overload and isolating switches.

Figure 2:
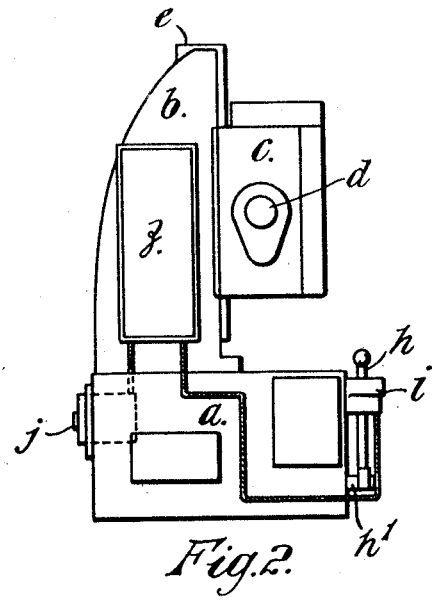
Fig. 2 is an elevation of the spindle slide end thereof.
Figure 3:
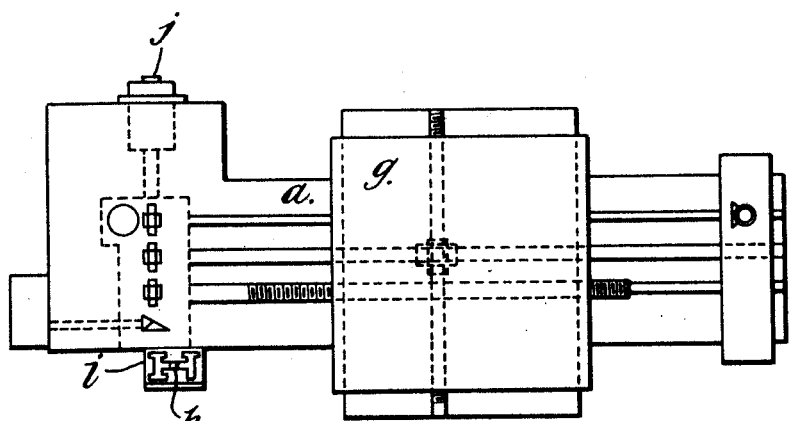
Fig. 3 is a plan of the bed of the machine.

Referring more particularly to Figs. 1 to 3, $a$ is the bed of a horizontal boring machine, of which $b$ is the column on which slides vertically the slide or head $c$ in which the boring spindle $d$ is journalled and is axially displaceable. $e$ is the column on which slides vertically the boring stay bearing $f$. $g$ is the compound worktable, the respective portions of which are longitudinally and transversely adjustable relatively to the machine bed $a$.

As shown more clearly in Figs. 4, 5 and 6, a control lever $h$ is mounted on one side of the machine. This control lever $h$ is pivoted at its lower end of a shaft $h^1$, Fig. 7, so as to move freely angularly transversely to the machine and to turn the shaft $h^1$ when moved angularly parallel to the longitudinal axis of the machine.

The control lever $h$ moves in a slotted gate $i$. In the construction shown in Figs. 1 to 7, the gate $i$ has an H-shaped slot. When, as shown in Figs. 1, 3, 4, 6 and 7, the control lever $h$ is at the midlength of the crossbar of the H-slot, the mechanism is in the neutral position. When the control lever $h$ is moved into the right hand limb $i^1$ of the H-slot and is thrust away from the operator, it becomes located to initiate rapid traverses, the direction of which is determined by whichever notch $i^2$, or $i^3$ of this limb $i^1$ into which the control lever $h$ is thrust. When the control lever $h$ is moved into the left hand limb $i^4$ of the H-slot and is pulled towards the operator, it becomes located to initiate crawling traverses, the direction of which is determined by whichever notch $i^5$ or $i^6$ of the limb $i^4$ into which the control lever $h$ is thrust. Similarly, when the control lever $h$ is thrust in the limb $i^4$ away from the operator, it becomes located to initiate impulse traverses, the direction of which depends upon the notch $i^7$ or $i^8$ of the limb $i^4$ into which the control lever $h$ is then thrust.

For convenience it is arranged that the displacements of the control lever $h$ in the gate $i$ correspond actually or conventionally to the adjustments which are effected, such as longitudinally and transversely of the worktable and downwards and upwards of the spindle slide and boring stay bearing. Thus displacement of the control lever $h$ to the left into any of the notches $i^2$, $i^5$ or $i^7$, initiates adjustments to the left, towards the operator or down, and displacement of the control lever $h$ to the right into any of the notches $i^3$, $i^6$ or $i^8$, initiates adjustments to the right, away from the operator or up.

Pulling the control lever $h$ into the unnotched end $i^9$ of the limb $i^1$ of the H-slot, initiates, as hitherto, through a pull rod $h^2$, Fig. 5, the particular pre-selected feed of the machine. The feeds are indicated in dotted lines in Fig. 3, and need not be described as they do not form part of the present invention. Incidentally the feeds are as usual driven either from a constant speed source, giving "inches per minute" feed, or from a variable speed source such as the boring spindle $d$ giving "cuts per inch" feed.

Coarse adjustment initiated by the displacements of the control lever $h$ into the notch $i^2$ or $i^3$ is effected by an alternating electromotor $j$, Figs. 2, 3 and 7, running normally, and which is stopped to permit fine adjustments to be effected.

When rapid coarse adjustment has been effected by the electromotor $j$ running normally on an A. C. supply, the control lever $h$ is displaced from the limb $i^1$ of the gate slot through the neutral position into the limb $i^4$ thereof, and is then brought opposite the notches $i^5$ and $i^6$ thereof to initiate crawling adjustment in the required direction. The electromotor $j$ then becomes connected to a D. C. supply by a rotary switch 28, Fig. 9, which is slowly rotated by a pilot electromotor 23, Fig. 9, and in phase with which the electromotor $j$ then rotates. The electromotor 23 starts on the control lever $h$ being pressed into the respective notch $i^5$ or $i^6$. This effects "crawling" adjustment.

For effecting final adjustment, the control lever $h$ is displaced along the limb $i^4$ of the H gate slot to opposite the notches $i^7$ and $i^8$ thereof. On then pressing the control lever $h$ into one of these notches $i^7$ or $i^8$, according to the direction of the traverse, the electromotor 23 is only momentarily connected to its source of supply, and therefore the rotary switch 28 makes only a partial rotation as likewise does the main electromotor $j$ then rotating in phase therewith. The adjustment thus receives an "impulse" every time the control lever $h$ is thrust into the notch $i^7$ or $i^8$.

Instead of the slot of the gate $i$ being of notched H configuration, it can be of notched angular U configuration as shown in Fig. 8, in which the various notches are marked to correspond with those shown in Fig. 6.

In being thrust into any of the notches, the control lever $h$ actually presses in the plunger of a microswitch in the respective relay circuit. The push buttons of the plungers can be seen in the several notches in Figs. 6 and 8.

The electric circuits by means of which the above described operations are carried out, are shown in Fig. 9.

The electromotor $j$ is a three-phase motor the terminals 1, 2, 3 of which are indicated in Fig. 9.

4 is the main switch in the three-phase supply circuit. This switch 4 also connects a lead 5 to one of the A. C. supply leads.

6 is the forward connector of the electromotor $j$ and which is operated by energisation of a relay coil 7, when the control lever $h$ is pushed into the notch $i^2$ of the gate $i$, closing the microswitch 8 therein.

9 is the reverse contactor of the electromotor $j$ and which is operated by energisation of a relay coil 10, when the control lever $h$ is pushed into the notch $i^3$ of the gate $i$, closing the microswitch 11 therein.

To prevent energisation of the relay coil 10 of the reverse contactor 9 when the relay coil 7 of the forward contactor 6 is energised, a normally closed interlock switch 12 in the circuit of the relay coil 10 is opened by the energised forward contactor relay coil 7. Inversely, a normally closed interlock switch 13 in the circuit of the relay coil 7 is opened by the energised reverse contactor relay coil 10.

To effect forward crawling adjustment, the control lever $h$ is pushed into the notch $i^5$ of the gate $i$. This closes the microswitch 14 therein which causes energisation of a relay coil 15. This closes a switch 16 which causes a relay coil 17 to become energised and close a triple contactor 18 in three leads from the three motor terminals 1, 2, 3. The energised relay coil 17 also closes a switch 19 which connects the primary winding 20 of a transformer to the A. C. main supply. The energised relay coil 15 also closes a switch 21 in the circuit of the forward rotation field winding 22 of the D. C. pilot motor 23. This pilot motor 23 is energised by an earthed rectifier 24 in the circuit of a secondary winding 25 of the transformer.

A second secondary winding 26 of the transformer supplies, through another earthed rectifier 27, direct current to the centre and to a slip ring of the rotary switch 28. This rotary switch 28 has arms 29 and 30, rotated by the pilot motor 23 and permanently in contact respectively with the centre and with the slip ring of the rotary switch 28. These two arms 29 and 30 wipe contact segments 31, 32, 33 successively, which, through the closed triple contactor 18, are connected each to a different terminal of the three terminals 1, 2, 3 of the three-phase motor $j$. By this means direct current is injected into the three-phase motor $j$, changing in polarity in phase with the rotation of the pilot motor 23 and thereby causing the motor $j$ to run in phase with the pilot motor 23.

The energised relay coil 15 also opens a switch 34 in the circuit of a relay coil 35 preventing the energisation thereof.

To effect reverse crawling adjustment, the control lever $h$ is pushed into the notch $i^6$ of the gate $i$. This closes the microswitch 36 therein which causes the relay coil 35 to become energised and open a switch 37 in the circuit of, and preventing energisation of, the relay coil 15. The energised relay coil 35 also closes a switch 38 in the circuit of the reverse rotation winding 39 of the pilot motor 23. Also a switch 40 is closed by the relay coil 35 closing a circuit through the D. C. triple contactor relay coil 17. The pilot motor 23 then rotates the rotary switch 28 in the reverse direction, reversely injecting direct current into, and causing reverse rotation in phase therewith, of the motor $j$.

When the motor $j$ is running on A. C. main supply, the circuits through the crawling adjustment microswitches 14 and 36 are kept open respectively by switches 42 and 43, opened respectively by the energised relay coils 7 and 10, thus preventing energisation of the relay coil 17 and thereby closing of the triple D. C. contactor 18. Inversely, when direct current is being injected into the motor $j$, connection of the latter to the A. C. supply is prevented by the energised relay coil 17 opening a switch 44 in the circuits of the relay coils 7 and 10 which close the forward and reverse A. C. contactors 6 and 9.

To cause forward impulse adjustment, the control lever $h$ is pushed in to the notch $i^7$ of the gate $i$, closing the microswitch 45 therein. This closes a circuit of a relay coil 46 which closes a switch 47 in parallel in the circuit of the relay coil 17 which thus becomes energised and closes the triple D. C. contactor 18. The energised relay coil 46 also closes a switch 48 in parallel in the circuit of the forward rotation field winding 22 of the pilot motor 23. In addition to closing the two switches 47 and 48, the energised relay coil 46 also closes a switch 49 which prepares a circuit to a relay coil 50.

The rectifier 24 supplies current to a circuit containing a slugged relay coil 51 and which is normally closed by a switch 52. The energised slugged relay coil 51 closes a switch 53 in the circuit of the relay coil 50 prepared by closure of the switch 49. The circuit of the relay coil 50 is thus prepared for closure by a rotary switch arm 54 on the rotating shaft of the rotary switch 28. On its resulting energisation the relay coil 50 opens the switch 52 in the circuit of the slugged relay coil 51 and closes a switch 55 which short circuits the rotary switch arm 54 and the contact which it wipes. Whilst the switch arm 54 is wiping its contact, another switch arm 56 on the shaft of the rotary switch 28, wipes a contact closing a circuit through the primary winding 20 of the transformer, thus energising the two secondary windings 25 and 26 and causing the rectifiers 24 and 27 to supply direct current. After a time interval the slugged relay coil 51 releases the switches 52 and 55 to open and close respectively, and the pilot motor 23 and the rotary switch 28 stop.

Between each impulse adjustment, the control lever has to be withdrawn from either notch $i^7$ or $i^8$ in which it happened to have been pushed. This enables the microswitches 45 and 57 in these notches to close a circuit through a relay coil 58 which closes a switch 59 which short circuits the switch arm 56 and its wiped contact.

A similar series of operations occurs when the control lever $h$ is pushed into the gate notch $i^8$ and actuates the microswitch 57 therein. This closes the circuit of a relay coil 60 which closes switches 61 and 63 in parallel with the switches 47 and 49 and closes a switch 62 in the circuit of the reverse rotation winding 39 of the pilot motor 23.

A switch 64 opened by the energised relay coil 46 prevents the relay coil 60 being energised whilst the relay coil 46 is energised, and a switch 65 opened by the energised relay coil 60 prevents the relay coil 46 being energised whilst the relay coil 60 is energised.

66 is a pilot lamp operated by closure of the switch 19 and which serves to indicate when direct current is being injected into the three-phase motor $j$. The lamp 66 is connected through a condenser 67 across the primary winding 20 of the transformer.

The speed of the pilot motor 23 is controlled by a variable resistance 68.

Most of the above described electrical components are contained in a panel $z$, Figs. 2 and 7.

The handwheel $k$ shown in Fig. 4 is that by which adjustments would be effected by hand.

I claim:

1. In a horizontal boring machine, a three-phase electromotor effecting adjustments of said machine, a control lever of said machine, a gate having pairs of opposed notches and in which said lever is displaceable in mutually perpendicular directions, microswitches operated by displacement of said lever into said notches, electric circuits controlled by said microswitches in one of said pairs of opposed notches and connecting said three-phase electromotor to a three-phase electric supply to rotate in selected directions, a source of direct current, a pilot electromotor driven by said source of direct current, a rotary switch driven by said pilot electromotor and connected to said source of direct current, electric circuits controlled by said microswitches in another of said pairs of opposed notches connecting said three-phase electromotor to said source of direct current through said rotary switch to rotate in selected directions in phase therewith, electric circuits controlled by said micro-switches in a further of said pairs of opposed notches also connecting said three-phase electromotor to said source of direct current through said rotary switch to rotate in selected direction in phase therewith, a slugged relay coil, an electric circuit through said slugged relay coil, a switch normally closing said circuit through said slugged relay coil and opened by said micro-switches in said further pairs of opposed notches, and a switch in the circuit of said pilot electromotor opened by said slugged relay coil.

2. A horizontal boring machine adjustment control arrangement as claimed in claim 1, in which said source of direct current is a rectifier in a circuit of a secondary winding of a transformer having a primary winding connected to said three-phase electric supply.

HENRY WARD LIONEL KEARNS.

References Cited in the file of this patent

UNITED STATES PATENTS

| Number | Name | Date |
|---|---|---|
| 2,428,309 | Gallimore | Sept. 30, 1947 |
| 2,537,269 | Harding | Jan. 9, 1951 |
| 2,561,346 | De Vlieg et al. | July 24, 1951 |